H. L. JOHNSTON.
COFFEE GRINDER.
APPLICATION FILED MAR. 23, 1917.
1,291,534.
Patented Jan. 14, 1919.
2 SHEETS—SHEET 1.
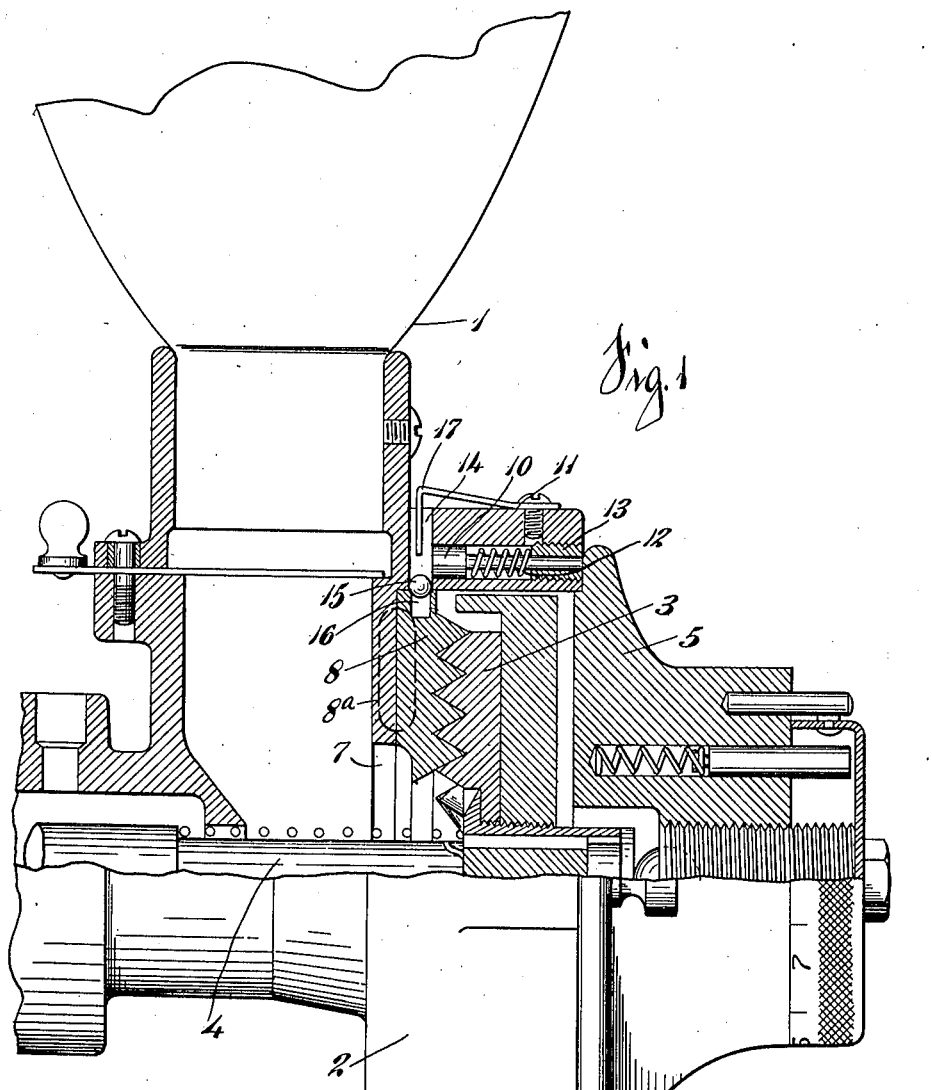
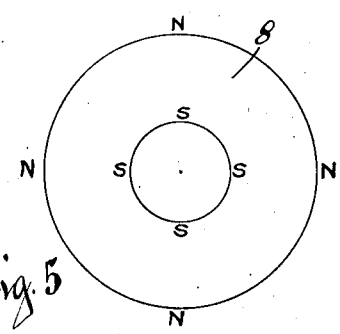
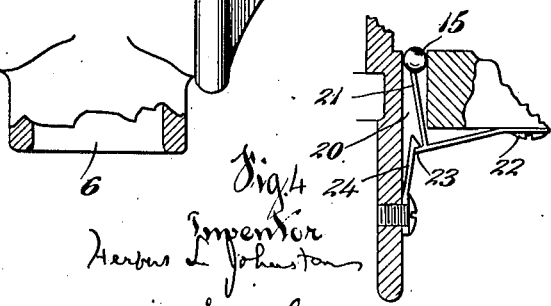

H. L. JOHNSTON.
COFFEE GRINDER.
APPLICATION FILED MAR. 23, 1917.
1,291,534.
Patented Jan. 14, 1919.
2 SHEETS—SHEET 2.
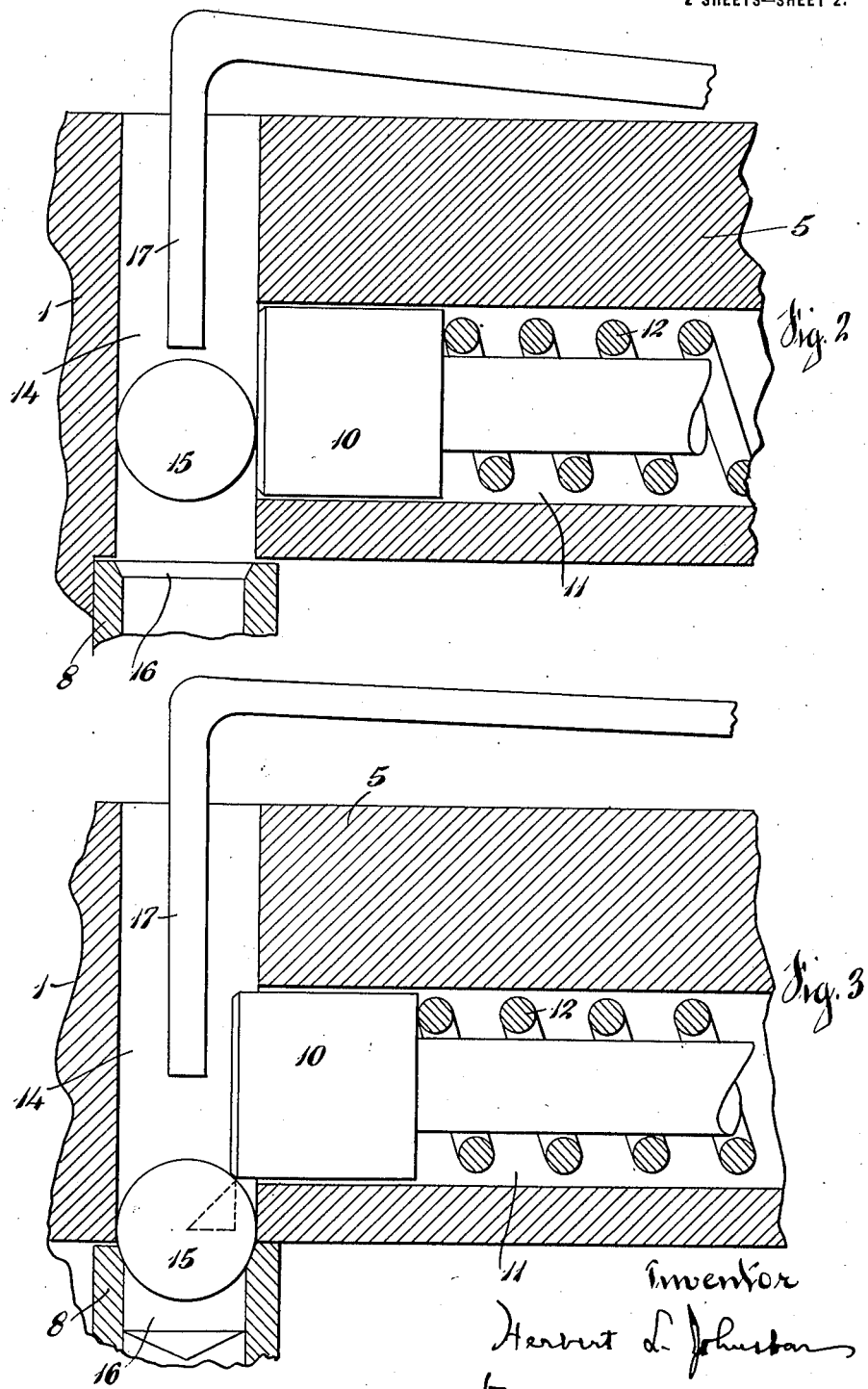

UNITED STATES PATENT OFFICE.

HERBERT L. JOHNSTON, OF TROY, OHIO, ASSIGNOR TO THE HOBART MANUFACTURING COMPANY, OF TROY, OHIO, A CORPORATION OF OHIO.

COFFEE-GRINDER.

1,291,534.      Specification of Letters Patent.      Patented Jan. 14, 1919.

Application filed March 23, 1917. Serial No. 156,860.

*To all whom it may concern:*

Be it known that I, HERBERT L. JOHNSTON, a citizen of the United States, and a resident of Troy, in the county of Miami and State of Ohio, have invented certain new and useful Improvements in Coffee-Grinders, of which the following is a full, clear, and exact description, reference being had to the accompanying drawing, forming part of this specification.

My invention relates to the usual type of coffee grinders wherein the coffee is fed from a hopper to the space between a fixed and a movable bur, where it is ground by the relative rotation of the burs, which crushes and splits up the grains of coffee. In devices of this kind, the fixed bur is likely to cause considerable damage to the machine if it becomes locked to the movable bur by some piece of hard material introduced with the coffee by accident.

To overcome the damage of such locking of the parts, it has been the practice in the past, either to provide for an automatically releasable fixed bur or to drive the movable bur in frictional or frangible manner. The invention forming the basis of this application deals with the former type of mechanism wherein the fixed bur is held releasably in place.

It is the object of the invention to provide a simple method of holding the fixed bur in the bur case against lateral movement, which method does not serve to retard rotary movement. As above stated, the object is also to provide an effective means of holding the bur against rotary movement, which means is releasable upon any tendency of the burs to lock together.

In the devices of the past having a releasable fixed bur, so far as I am informed, the retaining pin or whatnot was dropped into locking position after each revolution of the released bur, causing a chattering which was ruinous to the releasable retaining member. It is accordingly proposed to provide a releasable retaining member which when thrown out will stay out until the machine has been stopped and the parts readjusted.

In the drawings,

Figure 1 is a side elevation of the device with the upper half broken away so as to show in central longitudinal section.

Fig. 2 is a detail section showing the fixed bur retaining device in released position.

Fig. 3 is a detail section showing the same parts, with the device in operation to lock the bur against rotation.

Fig. 4 is a detail section of a modified form of releasable bur retainer.

Fig. 5 is a diagrammatic view to illustrate the magnetizing of the fixed bur.

The grinder has a hopper 1, and a bur case 2. The movable or rotary bur 3, on a shaft 4, extends into the bur case, which has a suitable closure 5, and a discharge orifice 6. The hopper has an orifice 7, through which the coffee enters through the center of the fixed bur.

The burs are alike, circular in shape and cut on their meeting faces with grinding teeth. The fixed bur 8 fits fairly snugly into the bur case, and has no mechanical means for holding it in place. Instead of this, the fixed bur is magnetized in such a way as to hold the bur fast against the hopper wall of the case and at the same time permit the bur to rotate around with the movable bur, should an accident occur.

For this purpose the bur is magnetized with positive poles around the outer edge thereof and negative poles around the central opening thereof. The bur case is oppositely magnetized by induction from the bur so that the bur can be dropped into place and will stick fast, and yet will cut no lines of force in being revolved. The arrows 8ª indicate the lines of force (Fig. 1), and Fig. 5 indicates in diagram the polarity of the fixed bur.

To insert the bur, it is merely placed in the right position in the bur case, where it will be held in place by magnetism and remain there. The magnetism in the bur case and the bur will last with sufficient strength for the life of the machine.

It is not necessary that the bur case be magnetized, although this may be done if desired. I also prefer to magnetize the movable bur so that the poles are the same as the fixed bur. This results in a repulsion and tends to establish a proper separation between the burs and prevents the induction of electric currents in the burs.

The above matters concerning the magnetism of parts have to do with the holding of the fixed bur in the bur case and form no part of the mechanism for releasably holding it against rotation. This mechanism in the preferred form comprises a hardened steel ball and a spring finger.

The spring plunger 10 is mounted in a hole or socket 11 in the bur case, and is pressed inwardly by a spring 12, which is adjusted for tension by the screw 13. The screw 13 has a central aperture for guiding the shank of the plunger and screws into the hole 11 in the case.

Another hole or socket 14 enters the bur case perpendicularly, which socket is large enough to permit the introduction of the hardened steel ball 15. The pin 10 also extends into this socket and acts on the ball.

The fixed bur has a hole 16 therein which registers with the hole 14 in the case, in one position of the bur. The ball is dropped into the socket and the spring finger drawn back to let it drop until it rests against the bur. The bur is then turned until the hole 16 is opposite the ball, when the ball will drop into place, partly in the hole 16 and partly in the case, and lock the bur.

The spring plunger is so positioned that at the point of contact with the ball, the plunger will be pressed against the ball above its median line and tend to hold it in place. A quick strain on the bur, however, will throw the ball up and push the plunger outwardly.

As soon as the ball gets clear into the bur case, out of locking position, the pin will press on the ball, at or slightly below its median line and hold it against dropping into the bur as it moves around past the socket on every revolution.

A bent finger 17 may be provided which projects into the ball socket, and may be depressed in resetting the device after a release of the fixed bur to push the ball down past its dead center against the spring finger.

The releasable ball mechanism now described may be positioned anywhere around the bur case, as it is independent of gravity. Another method dependent on gravity for holding the ball out of the way after its release, is shown in Fig. 4.

In this the socket 20 in the casing must extend up from the under side. The ball is placed in the socket and held there by a pin 21, which is maintained in place by screwing it to the bur case at 22. This pin or finger is L-shaped and has a shoulder 23, which when the pin is drawn outwardly will be caught by a hook 24.

The inherent spring in the pin keeps its end in the socket 20. When the ball is forced out, the pin will be forced up until it is caught by the hook 24. The ball will stay out of its hole by gravity, and the spring finger will be held taut.

Having thus described my invention, what I claim as new and desire to secure by Letters Patent, is:—

1. In a machine of the character described, a casing, a rotatable bur mounted therein, with means for rotating the same, a second bur to coöperate with the rotatable bur, and means for normally locking said bur in fixed position in the casing, said means comprising a ball located between the casing and the bur, with means for holding the ball in engaging position, said means adapted to yield under pressure to release the fixed bur and allow the same to rotate with the rotatable bur and means for holding said locking means out of operation when released until reset.

2. In a grinder machine, a casing, a movable bur and a fixed bur, said fixed bur mounted with its face in close and positive contact with the casing and being magnetized so as to have positive magnetism of one polarity at the periphery thereof and the opposite at the center to hold it in place in the casing.

3. In a grinder machine, a casing, a movable bur and a fixed bur, said fixed bur mounted with its face in close and positive contact with the casing and being magnetized so as to have magnetism of one polarity at the periphery thereof and the opposite at the center to hold it in place in the casing during the assembling of the parts, and means for releasably holding said bur against rotation within said casing.

4. In a grinder, a casing, a movable bur and a fixed bur, with means for releasably holding the fixed bur in the casing comprising a ball, said bur having a pocket to partially receive the said ball, and said casing being socketed to partially retain said ball, and spring means contacting with said ball and adapted to hold it in the bur pocket comprising a pin at right angles to the casing socket and positioned so as to contact with the upper part of the ball when it is in the bur, and the central part of the ball when forced out of the bur into the casing socket.

HERBERT L. JOHNSTON.